United States Patent [19]

Foss et al.

[11] Patent Number: 4,637,626
[45] Date of Patent: Jan. 20, 1987

[54] PORTABLE, FOLDABLE AND CONVERTIBLE LUGGAGE TROLLEY

[75] Inventors: Janet M. P. Foss, Naish Hillhouse, Reybridge, Lacock, England; John Foss, Lacock; C. G. Brooks, Wilts, both of United Kingdom; Myron H. Ridgely, Waynesboro, Pa.

[73] Assignee: Janet Mary Penrose Foss, England

[21] Appl. No.: 667,331

[22] Filed: Nov. 1, 1984

Related U.S. Application Data

[63] Continuation-in-part of Ser. No. 449,824, Dec. 14, 1983.

[51] Int. Cl.$^4$ .............................................. B67B 3/02
[52] U.S. Cl. ............................. 280/655; 280/4737 R; 280/43.17; 16/112
[58] Field of Search ............... 280/47, 37 R, 47.36, 280/47.34, 30, 79.1 R, 638, 639, 655, 659, 651, 35, 47.18, 43.13, 43.17; 292/213, 230, 238; 16/112

[56] References Cited

U.S. PATENT DOCUMENTS

| | | | |
|---|---|---|---|
| 639,338 | 12/1899 | Barnes | 280/651 |
| 1,160,290 | 11/1915 | Jones | 292/213 |
| 2,751,233 | 6/1956 | Racker | 280/641 |
| 3,305,243 | 2/1967 | Manfredi | 280/651 |

Primary Examiner—John J. Love
Assistant Examiner—Richard Camby
Attorney, Agent, or Firm—Diller, Ramik & Wight

[57] ABSTRACT

This disclosure relates to a portable, foldable and convertible luggage trolley which includes first and second base supports joined by a pivot so as to be folded between a nested position and a position in side-by-side coplanar relationship, the first and second base supports carrying first and second sets of wheels, another pivot joining a handle to the first base support and still another pivot for pivotally connecting a luggage restraining member to the second base support whereby the handle and luggage restraining member are each pivoted between an operative generally normal position relative to the first and second base supports and an inoperative position in generally nested relationship thereto, a pivoted lock responsive to movement of the handle to its operative position to automatically lock the handle thereat, and another lock automatically moved to its locked position during pivotal movement of the luggage restraining member to its operative position to maintain the same locked thereat.

31 Claims, 28 Drawing Figures

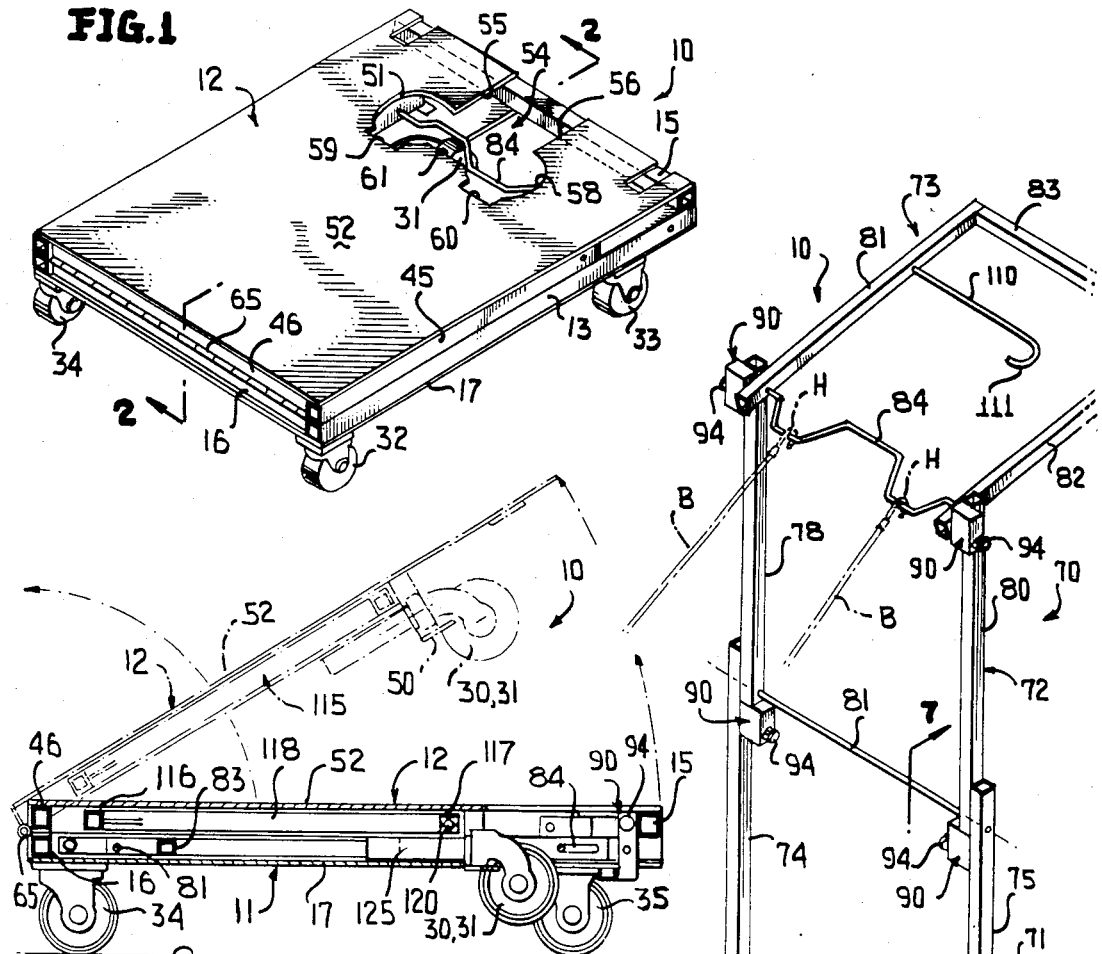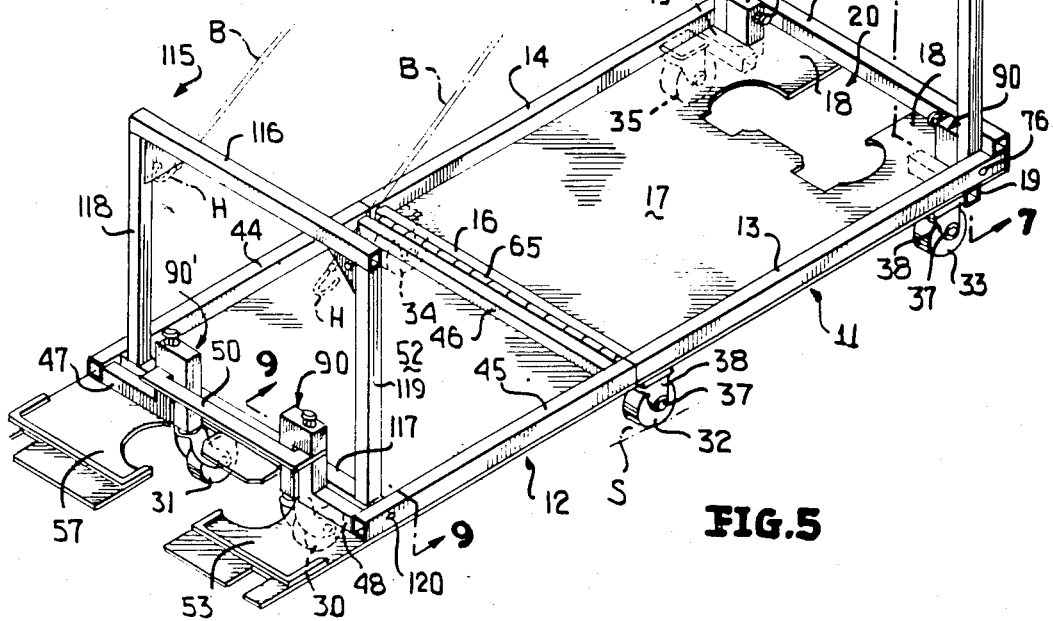

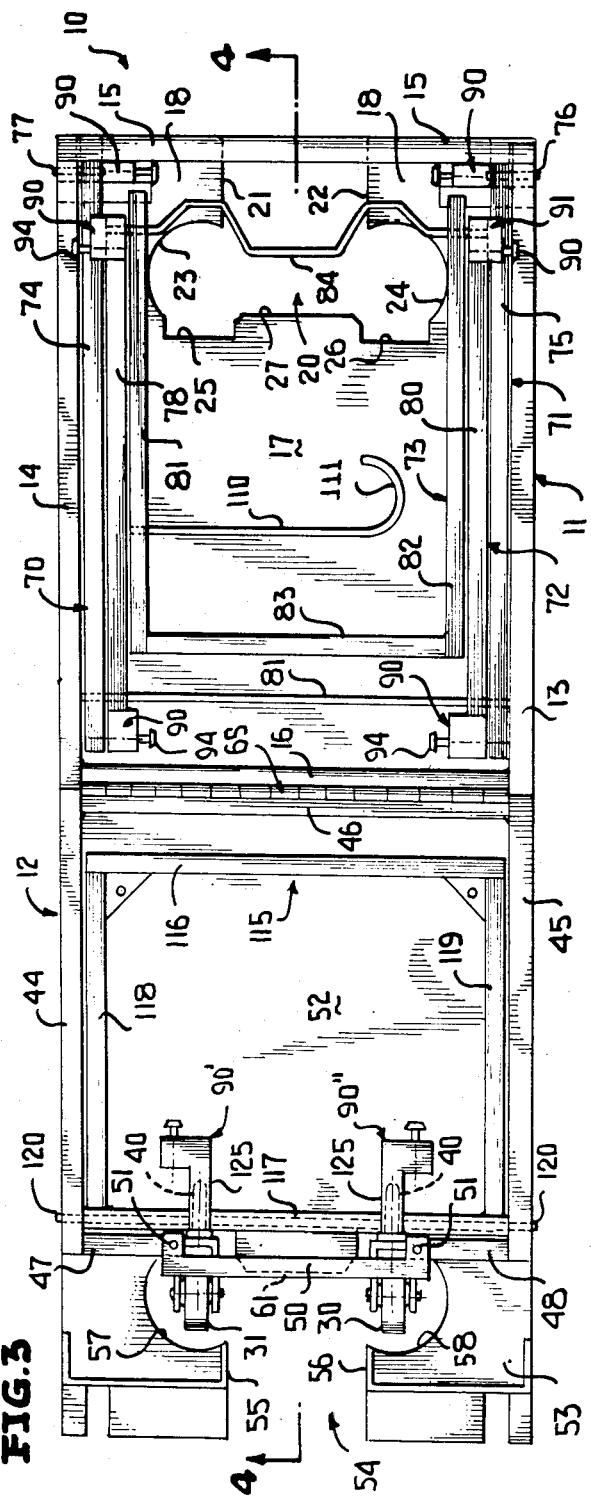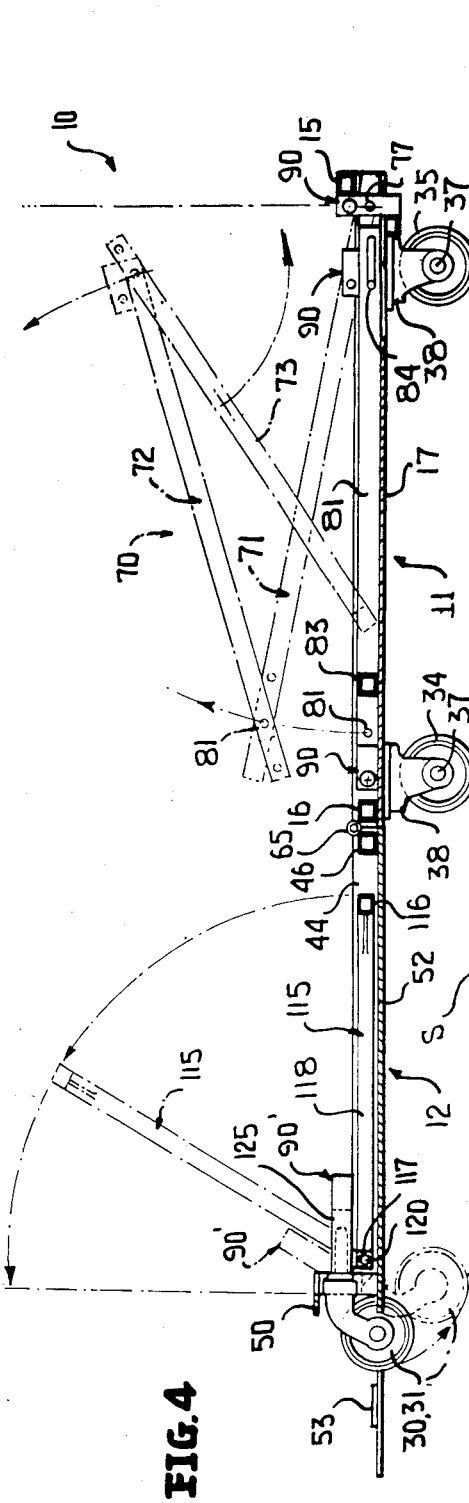
FIG. 3
FIG. 4

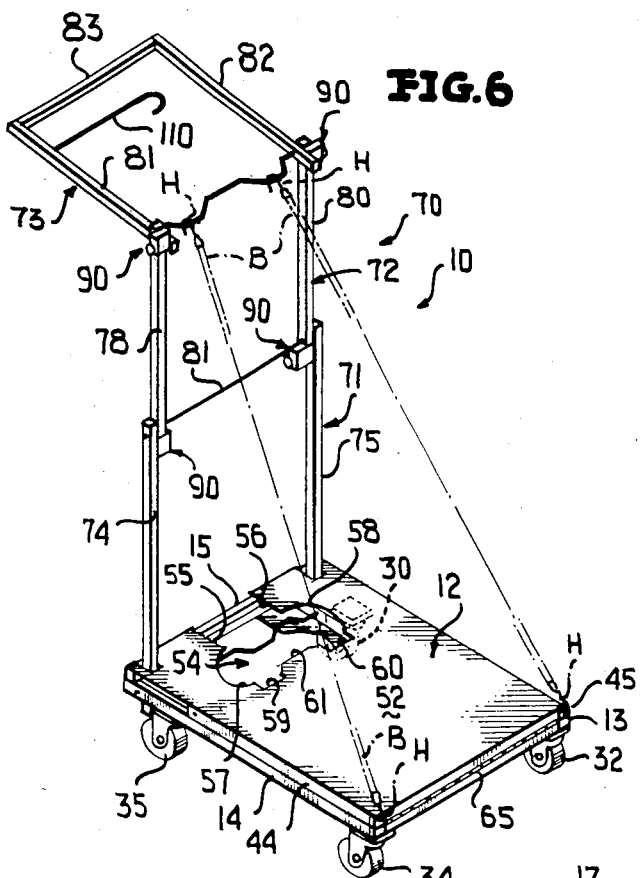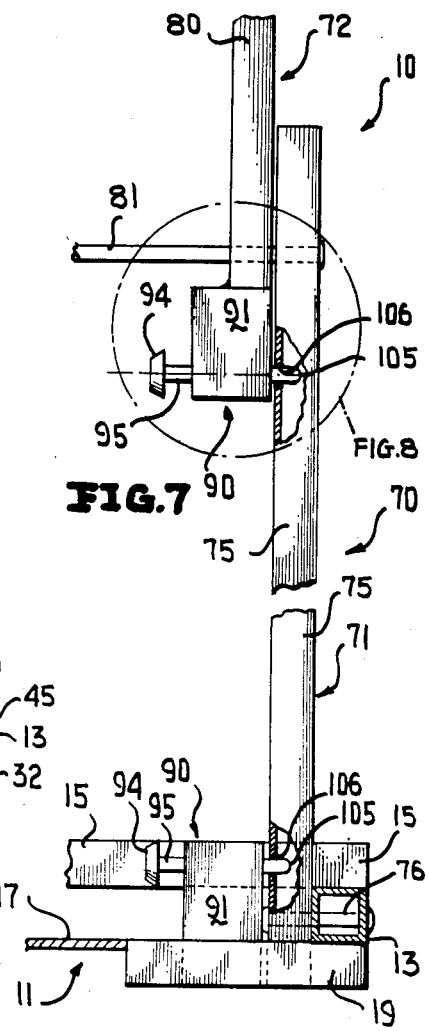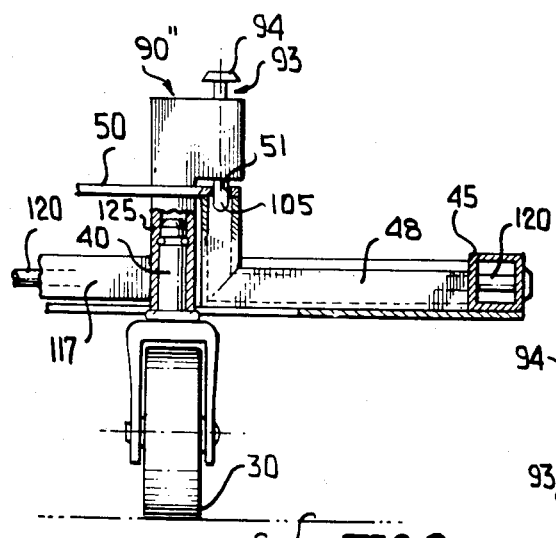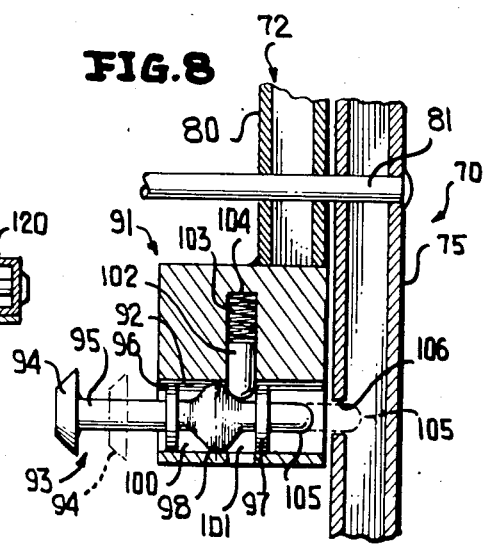

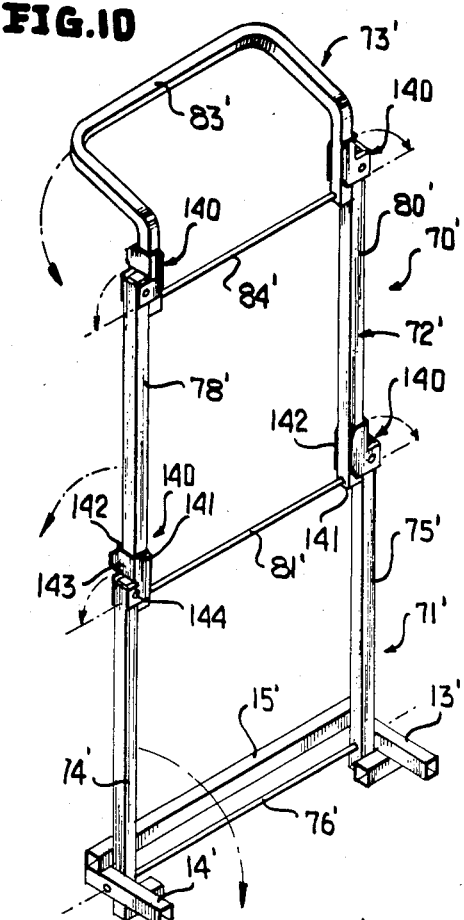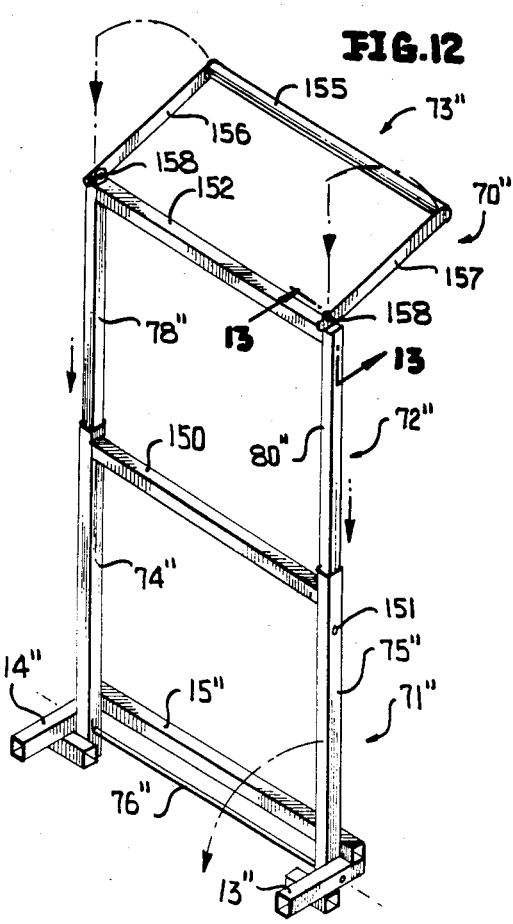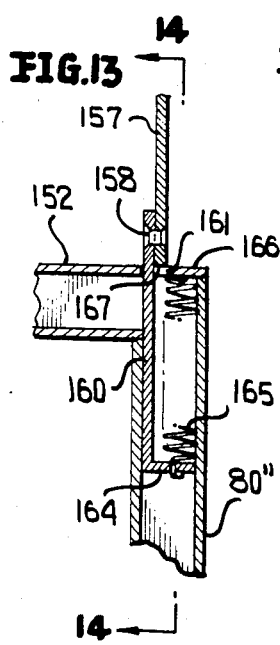

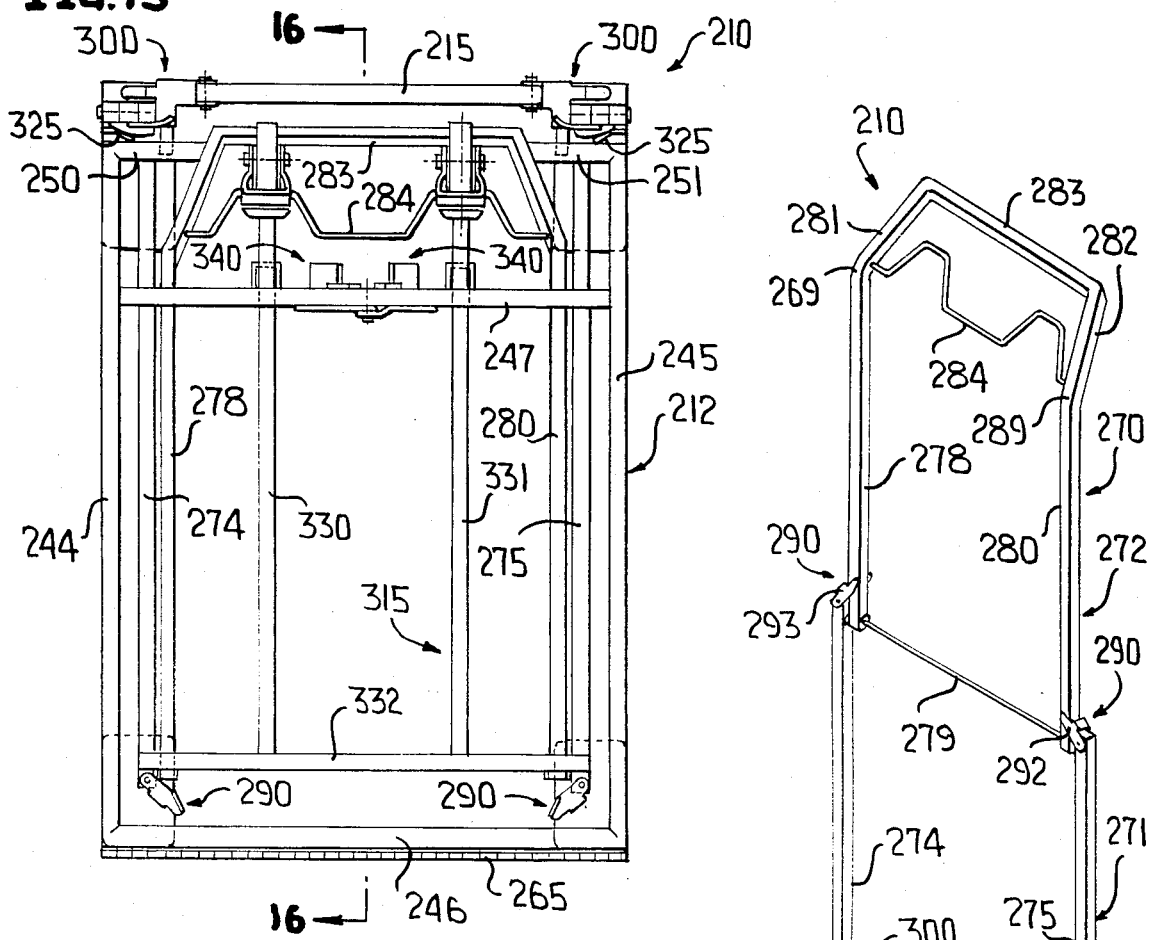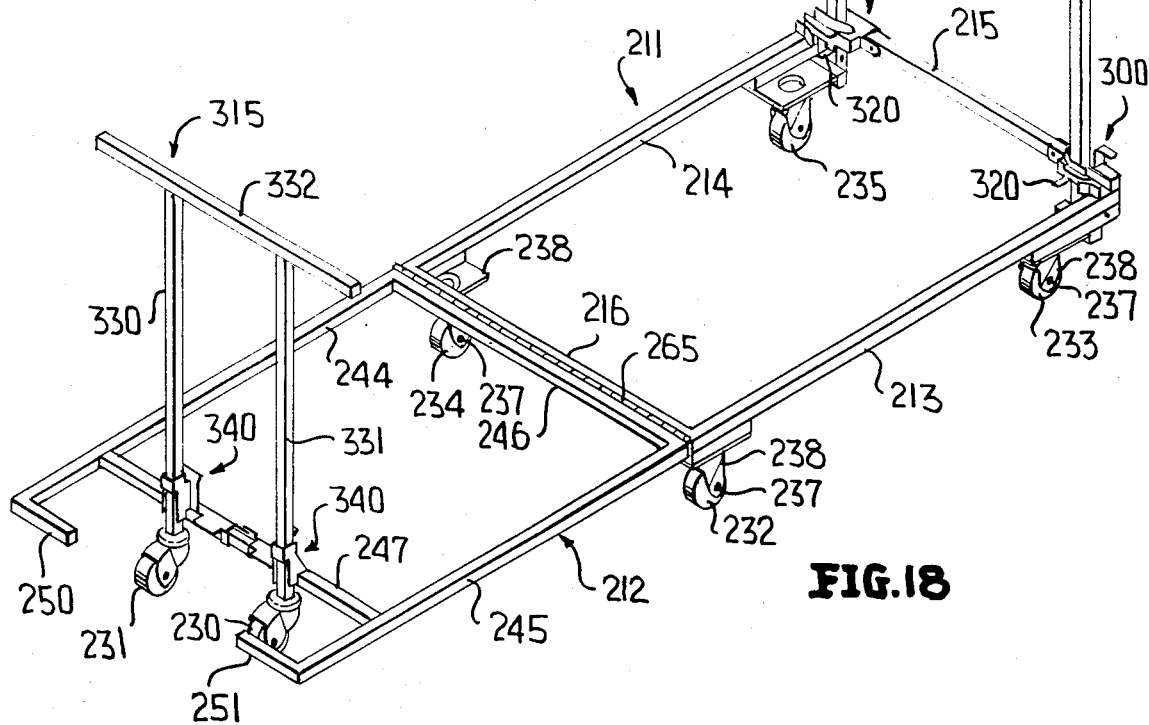

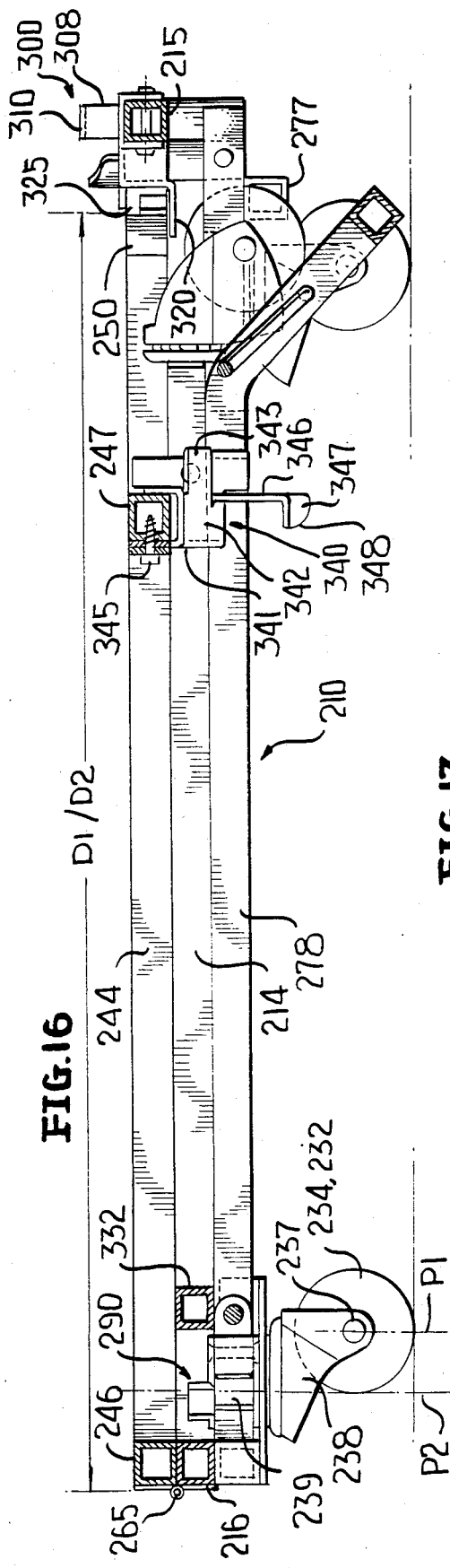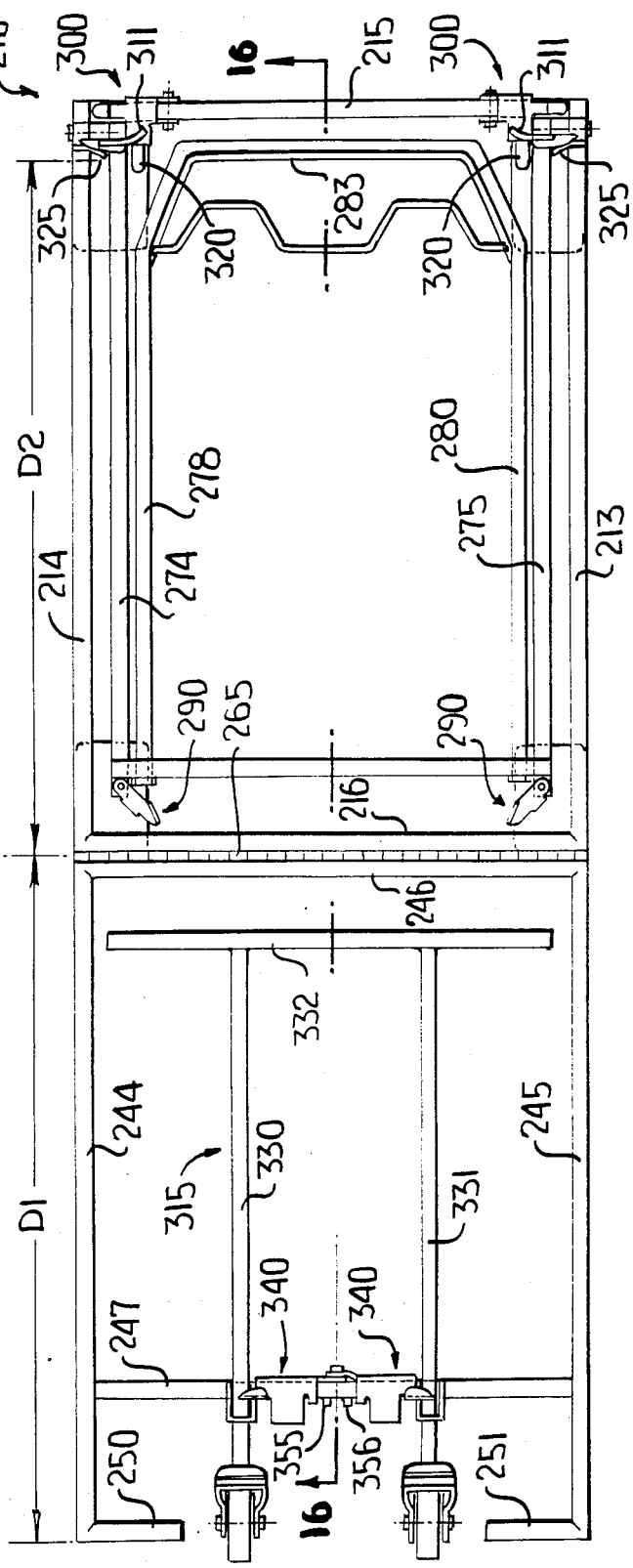
FIG.16
FIG.17

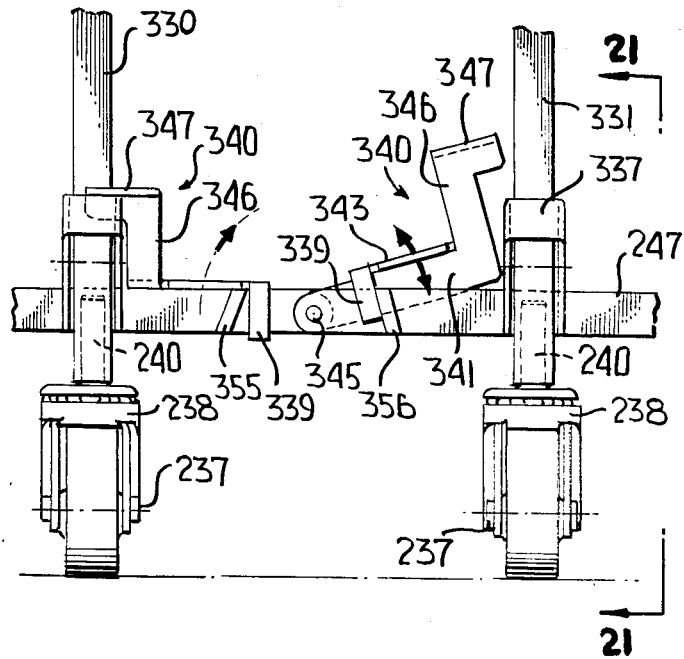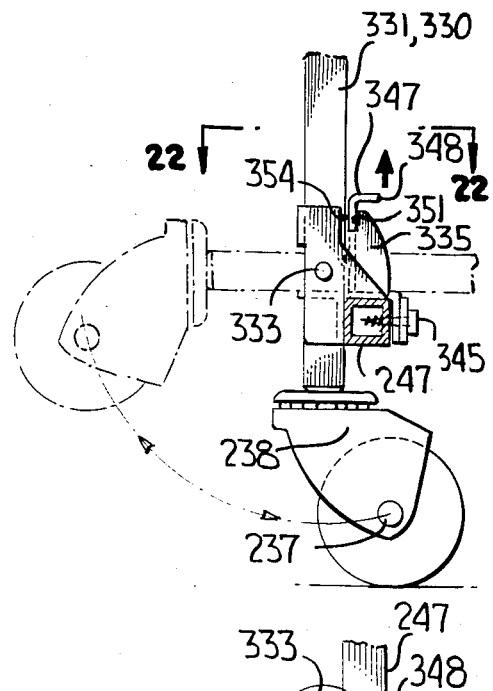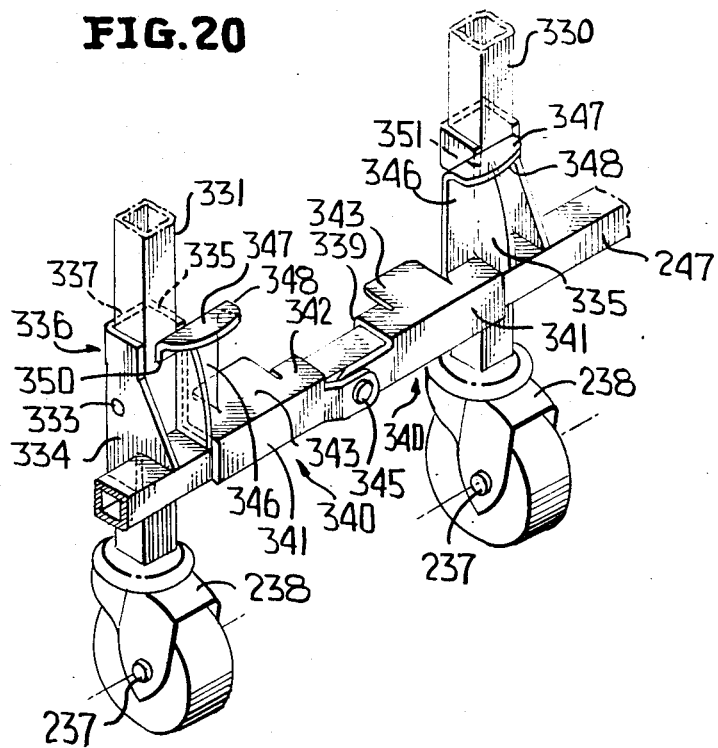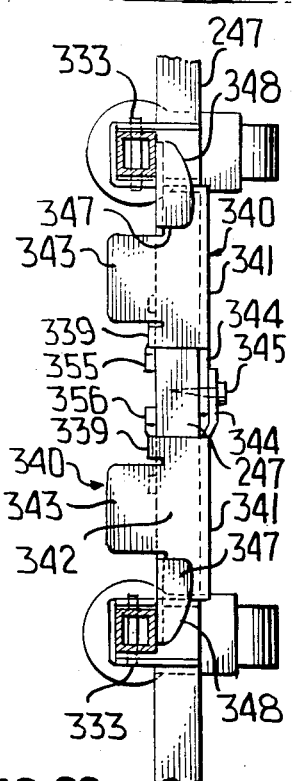

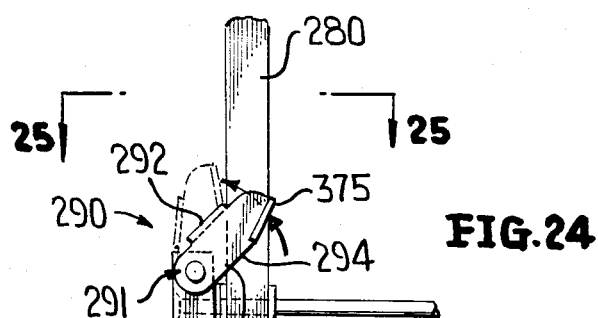
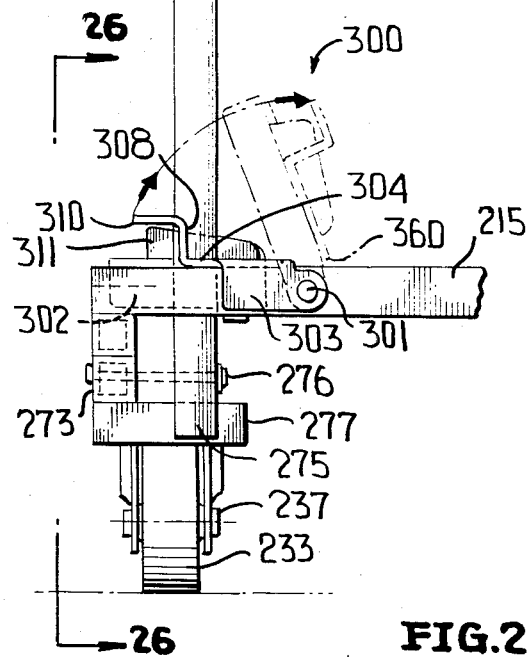
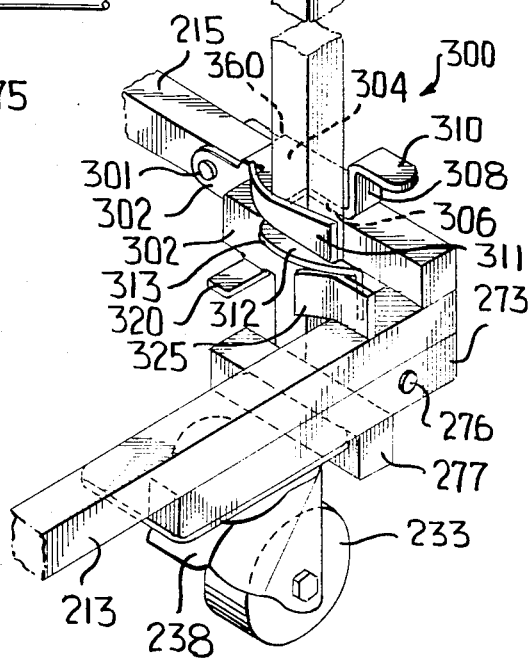
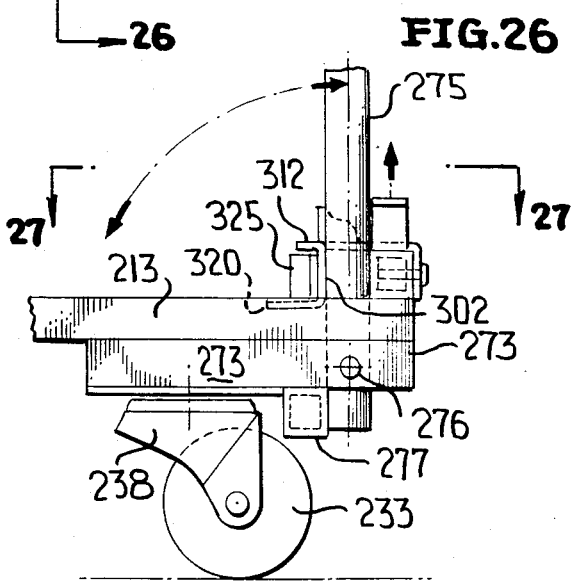
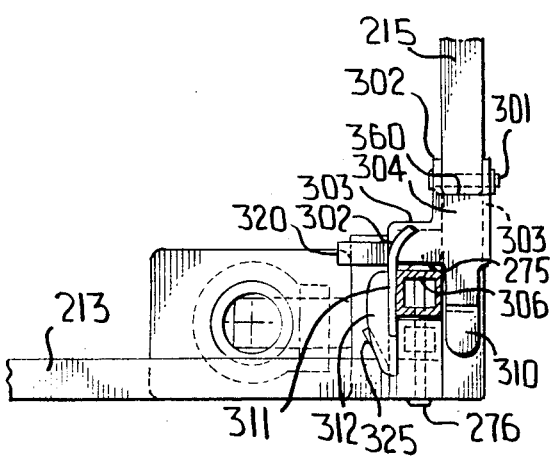
FIG. 23
FIG. 24
FIG. 25
FIG. 26
FIG. 27

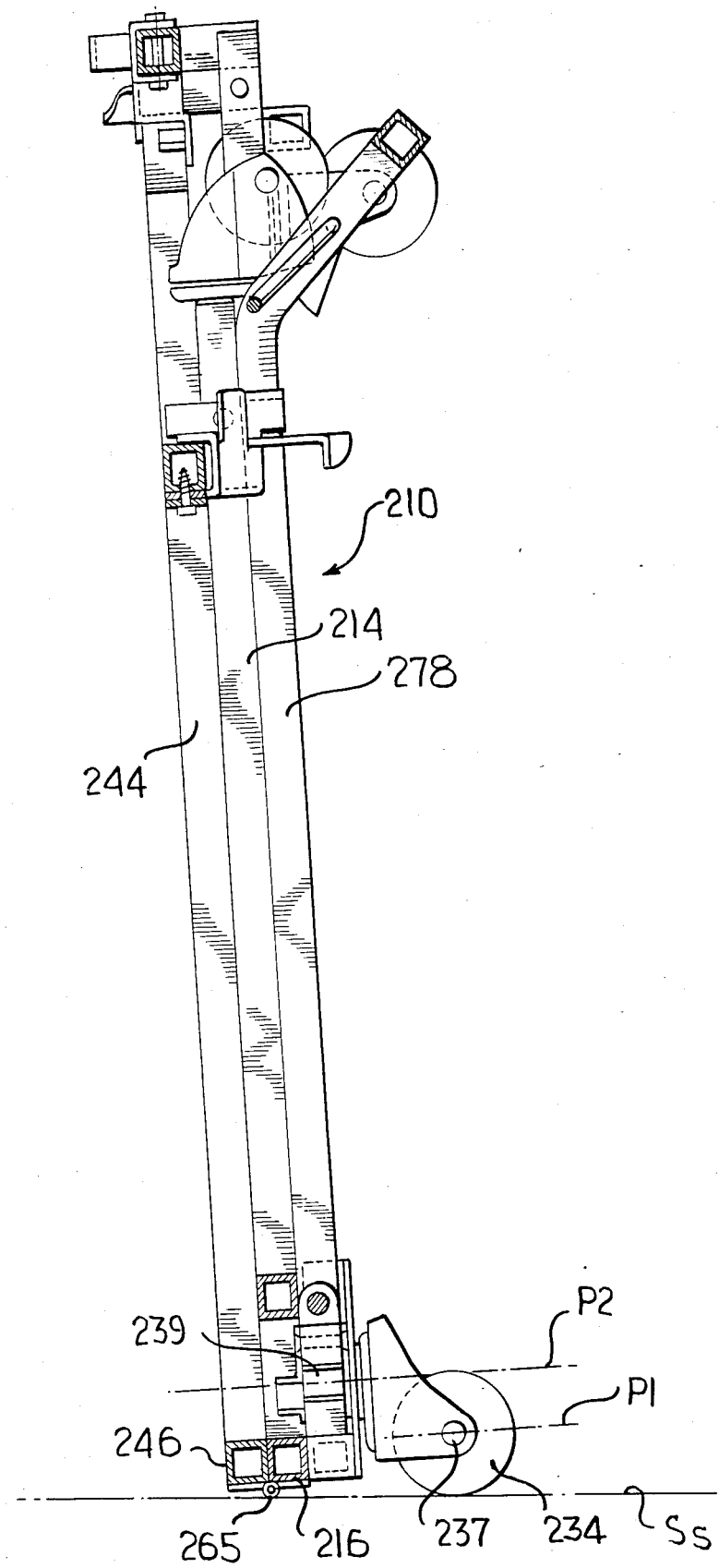

PORTABLE, FOLDABLE AND CONVERTIBLE LUGGAGE TROLLEY

This application is a continuation-in-part of application Ser. No. 06/449,824 filed on Dec. 14, 1983 in the name of Janet M. P. Foss et al and entitled PORTABLE, FOLDABLE AND CONVERTIBLE LUGGAGE TROLLEY.

The present invention is directed to a novel portable, foldable and convertible luggage trolley which is particularly designed for accommodating relatively heavy luggage and/or a considerable number of pieces of luggage, yet is relatively light-weight, can be folded to a small size when not in use, and can be converted between two different positions of use to accommodate the size, weight and/or number of articles, baggage or luggage which is transported thereby.

In keeping with the foregoing, a primary object of this invention is to provide a novel portable, foldable and convertible luggage trolley of the type aforesaid which includes first and second base supports joined by first pivot means for pivoting the base supports between side-by-side coplanar and nested positions in both of which luggage can be transported by the trolley, the first and second base supports carrying first and second wheels, handle means defined by at least a pair of handle members pivotally connected to each other and to the first base support by appropriate pivot means, and a luggage restraining member or carriage pivotally connected to the second base support and being movable between a position in nested relationship to the second base support and a position normal thereto, whereby in the latter position luggage can be supported upon both the first and second base supports while in their side-by-side relationship and upon the nesting of the luggage restraining member relative to the second base support and the nested relationship of the latter to the first base support luggage can be supported upon the second base support thereby accommodating luggage varying considerably in size, weight and number of pieces.

Still another object of this invention is to provide a novel luggage trolley as aforesaid wherein the luggage restraining member is part of and is pivotally connected to the second base support and carries the wheels thereof, and the wheels are rendered inoperative and are moved out of ground contacting engagement when the luggage restraining member is disposed in nested relationship to the second base support.

Yet another object of this invention is to provide a novel luggage trolley as aforesaid wherein means are provided for locking the luggage restraining member or carriage in its position generally normal to the second base support.

A further object of this invention is to provide a novel luggage trolley wherein each of the handle members are not only pivotally connected to each other but include locking means for locking adjacent ends of the handle members to each other and the handle member most adjacent the first base support to the latter.

Still another object of this invention is to provide a novel luggage trolley of the type aforesaid wherein a gripping handle of the handle means is mounted in telescopic relationship to its next adjacent handle member.

Still another object of this invention is to provide a novel luggage trolley as aforesaid wherein the locking means include slidably mounted locking pins held by spring-biased detent means in both locked and unlocked positions and in the former of which an end of each locking pin is received in an opening of an associated member.

Still another object of this invention is to provide a novel luggage trolley of the type aforesaid wherein one of the handle members include a bight and a pair of legs, each leg being formed of two elements joined together by a pivot, the other of a pair of handle members including a pair of tubes, a spring in each tube, a first of each two elements being telescopically received in an associated tube, each spring urging its associated first element into its associated tube, and the second of the two elements having a terminal edge in transverse spanning relationship to an associated tube when the one handle member is disposed with its two leg elements of each of the pair of legs in a position other than an aligned position.

Still another object of this invention is to provide a novel portable and foldable luggage trolley including a base support adapted to be disposed in a generally horizontal plane for supporting luggage thereupon, a handle, first means for pivoting the handle to the base support for pivoting movement between a first position in generally upright relationship to the base support and a second position in generally adjacent relationship to the base support. Means for releasably latching the handle relative to the base support in the first position, second means for pivoting the latching means to the base support for pivoting movement between a first latched position latching the handle relative to the base support in the first handle position and a second unlatched position permitting relative pivoting movement of the handle between the first and second position thereof, means responsive to pivotal movement of the handle from the second to the first handle position for pivoting the latching means to the first latched position, the responsive means being a cam surface of the latching means, the first pivot means establishes a path of travel of the handle which lies in a plane generally normal to a horizontal plane of the base support, the cam surface is at least partially within said plane in the unlatched position of the latching means, the latching means being defined by a pair of legs and a bight therebetween, and a slot in the bight is contoured to embracingly engage the handle in the first latched position.

A further object of this invention is to provide a portable and foldable luggage trolley including a base support adapted to be disposed in a generally horizontal plane for supporting luggage thereupon, means for restraining the movement of luggage along the base support in at least one direction, the luggage movement restraining means being defined by at least one luggage restraining member adapted in a first luggage restraining position to project generally upright above a horizontal plane, first pivot means for pivoting the luggage restraining member for pivoting movement between the first luggage restraining position and a second position in generally adjacent relationship to the base support, means for releasably latching the luggage restraining member relative to the base support in the first luggage restraining position, second means for pivoting the latching means to the base support for pivoting movement between a first latched position latching the luggage restraining member relative to the base support in the first luggage restraining position and a second luggage nonrestraining position, means responsive to pivotal movement of the luggage restraining member from the second luggage nonrestraining position to the first luggage restraining position for pivoting the latching means to the first latched position, the responsive means being effective for pivoting the latching means from the second unlatched position to the first latched position during movement of the luggage restraining member from the luggage nonrestraining position to the luggage restraining position, said responsive means being a cam surface of the latching means, the first pivot means establishes a path of travel of the luggage restraining member which lies in a plane generally normal to a horizontal plane of the base support, the responsive means is at least partially within said plane in the unlatched position of the latching means, means for abutting the luggage restraining member to establish the end of its travel along the path of travel at the first luggage restraining position, and the luggage restraining member being sandwiched between the abutting means and the latching means in the first latched position.

Yet another object of this invention is to provide a novel portable and foldable luggage trolley including a pair of base supports adapted to be disposed in a generally common horizontal plane in side-by-side relationship in a first position of use and being movable to a second position at which the pair of base supports are generally in stacked relationship with the first of the base supports being atop a second of the base supports, pivot means adjacent contiguous adjacent first sides of the first and second base supports for effecting pivotal movement thereof between the first and second positions, means for latching the first and second base supports in the second stacked position, the latching means including first and second cooperative latching surfaces carried respectively by the first and second base supports, at least one of the first and second latching surfaces being resilient, the resilient latching surface being spaced a first predetermined distance from the first pivot means, the remaining one of the first and second latching surfaces being spaced a second predetermined distance from the first pivoted means greater than the first predetermined distance, and the resilient latching surface and remaining latching surface being aligned along a line generally normal to the pivot means whereby upon relative movement to the second position, the resilient latching surface is deflected by the remaining latching surface beyond the first predetermined distance creating a resilient latching action between the latching surfaces.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a perspective view of a portable foldable and convertible luggage trolley in accordance with this invention, and illustrates the same in its folded position.

FIG. 2 is a cross-sectional view taken generally along line 2—2 of FIG. 1, and illustrates the manner in which various components of the trolley are nested and in phantom outline the movement of one of the base supports toward its operative luggage supporting position.

FIG. 3 is a top plan view of the luggage trolley, and illustrates two of the base supports in side-by-side relationship in a common plane prior to the unfolding of a luggage member and a handle toward operative positions thereof.

FIG. 4 is a sectional view taken generally along line 4—4 of FIG. 3, and illustrates in phantom outline the manner in which the luggage restraining member and the handle is moved toward operative positions.

FIG. 5 which is on the sheet of drawings containing FIGS. 1 and 2 is a perspective view of the luggage trolley, and illustrates the luggage restraining member or carriage and the handle in an operative position at which luggage can be supported upon both of the base supports.

FIG. 6 is a perspective view of the luggage trolley, and illustrates the luggage restraining member and one of the base supports in superposed relationship to an underlying base support for reducing the carrying capacity of the luggage trolley.

FIG. 7 is an enlarged fragmentary sectional view taken generally along line 7—7 of FIG. 5, and illustrates locking means for locking handle members to each other and to one of the base supports.

FIG. 8 is an enlarged fragmentary sectional view of the encircled portion of FIG. 7, but shown in cross-section, and illustrates a spring-biased detent for holding a locking pin in each of its relative locked and unlocked positions and an opening in an adjacent member for receiving a terminal end of the pin in its locked position.

FIG. 9 is an enlarged fragmentary sectional view taken generally along line 9—9 of FIG. 5, and illustrates the manner in which one of a pair of wheels is carried by the luggage restraining member or carriage and is locked in its operative ground-contacting position.

FIG. 10 is a fragmentary perspective view of another embodiment of the invention, and illustrates a handle formed of several handle members pivotally joined to each other and locked by cooperative locking or latching members selectively pivoted thereto.

FIG. 11 is a fragmentary side elevational view, partly in cross-section, and illustrates one of the locking members in both its locked and unlocked positions.

FIG. 12 is a perspective view of another luggage trolley constructed in accordance with the invention, and illustrates a telescopic handle formed of a pair of relatively telescopic handle members.

FIG. 13 is an enlarged fragmentary sectional view taken generally along line 13—13 of FIG. 12, and illustrates a hand grip formed of a bight and a pair of legs which can be pivoted and telescoped between operative and inoperative positions thereof.

FIG. 14 is a sectional view taken generally along line 14—14 of FIG. 13, and illustrates two positions of one of the legs of the hand grip of the handle of FIGS. 12 and 13.

FIG. 15 is a top plan view of another luggage trolley constructed in accordance with this invention and illustrates the luggage trolley in its folded condition.

FIG. 16 is an enlarged cross-sectional view taken generally along line 16—16 of FIG. 15 and illustrates the details of the nested position of the luggage trolley.

FIG. 17 is a top plan view of the luggage trolley, similar to FIG. 15, but illustrates one of two base supports moved from its nested position atop the other of the base supports to a position in alignment therewith in a common horizontal plane.

FIG. 18 which appears on a sheet of drawing containing FIG. 15 is a perspective view of the luggage trolley, and illustrates the luggage restraining member or carriage and the handle in an operative position and held thereat by associated latching or locking means.

FIG. 19 is a fragmentary elevational view of the luggage restraining member, and illustrates two pivotally mounted latching members, one in a latched position holding the luggage restraining member in its operative position and the other pivoted to an inoperative position at which the luggage restraining member can be pivoted toward in its inoperative position.

FIG. 20 is a fragmentary perspective view of the luggage restraining member and its associated latching means, and illustrates both latching means or members holding tubes of the restraining member confined within generally U-shaped housings.

FIG. 21 is a fragmentary side elevational view taken along the line 21—21 of FIG. 19 and illustrates the manner in which one of the pivoted latching means is held in its latched position.

FIG. 22 is a cross-sectional view taken generally along line 22—22 of FIG. 1, and illustrates cam surfaces of the latching members which automatically move the latching members to their latched position upon the movement of the luggage restraining member to its operative upright position.

FIG. 23 is a fragmentary perspective view of one of the base supports and a tube of the handle pivoted thereto, and illustrates latching or locking means for holding the handle upright in its operative position relative to the base support and for holding handle portions of the handle in a generally vertically common plane.

FIG. 24 is a view from the rear of that shown in FIG. 23, and illustrates the manner in which the handle to base and handle to handle latching means are moved between operative and inoperative positions.

FIG. 25 is a cross-sectional view taken generally along line 25—25 of FIG. 24 and illustrates the manner in which one of the latching means embraces one of the handle portions.

FIG. 26 is a fragmentary side elevational view looking along the line 26—26 of FIG. 24, and illustrates an abutment cooperative with the handle to limit pivoting thereof to its upright vertical position.

FIG. 27 is a cross-sectional view taken generally along line 27—27 of FIG. 26, and illustrates a cam surface of the latching member which is contacted by the handle during the movement of the latter to its operative position for automatically operating the latching means.

FIG. 28 is a cross-sectional view identical to FIG. 16, but illustrates the luggage trolley supported on one of its edges remote from the trolley handle.

A portable, foldable and convertible luggage trolley constructed in accordance with this invention is generally designated by the reference numeral 10 and includes a pair of base supports 11, 12 (FIGS. 1 through 5) adapted to be positioned in a generally common horizontal plane in side-by-side coplanar relationship in a first position (FIGS. 3, 4 and 5) and being movable to a second position at which the pair of base supports 11, 12 are generally in stacked or nested relationship relative to each other (FIGS. 1, 2 and 6).

The base support 11 is formed of a pair of hollow square rods 13, 14 disposed in generally parallel relationship to each other, a similar hollow square rod or tube 15 spanning and welded to upper surfaces of the tubes 13, 14 and another hollow rod or tube 16 parallel to the tube 15 and welded to the tubes 13, 14 (FIGS. 3, 4 and 5). A decorator plate 17 contacts the underside of the tubes 13, 14 and 16 and is welded thereto. A right-handmost edge 18 of the plate 17 defines an irregularly shaped opening 20 which is defined by two spaced parallel edges 21, 22, adjacent arcuate edges 23, 24, respectively, two shallow generally U-shaped arcuate edges 25, 26 and an edge 27 bridged therebetween. The opening 20 functions as means for receiving wheel or wheel means 30, 31 of the base support 12 when the latter is pivoted to its position atop the base support 11 in the manner best illustrated in FIG. 2, noting that the wheels 30 (and 31) project through the respective openings 24, 26 (and 23, 25) but do not contact a supporting surface S, as will be described more fully hereinafter.

The base support 11 is supported by four wheels or wheel means 32 through 35 (FIG. 5) which are mounted for rotation on identical horizontal shafts 37 of identical brackets or casters 38 mounted in a conventional manner for pivoting through 360 degrees about a vertical axis through the utilization of a vertical shaft 40 (FIG. 9), as in the case of the wheels 30, 31. The wheels 32 through 35, the brackets 38, etc., are conventional hardware and the specific details thereof form no part of the present invention.

The second base support 12 is formed by a pair of hollow generally square tubes or rods 44, 45 disposed in parallel relationship to each other and being welded at one end to a transverse rod 46. Remote from and generally parallel to the hollow tube or rod 46 is a pair of spaced generally L-shaped hollow tubes 47, 48 welded to the tubes 44, 45 and being bridged by a narrow generally U-shaped plate 50 whose ends have openings 51 (FIG. 9) in alignment with the upwardly projecting ends of the tubular rods or tubes 47, 48 (FIG. 9). The U-shaped plate 50 is preferably welded to the upper end of the tubes 47, 48. As in the case of the base support 11, the base support 12 has welded to the underside of the tubes 44, 45, 46, 47 and 48 a decorator plate 52 whose left handmost edge 53, as viewed in FIGS. 3 and 5, is cut away by a slot 54 of an irregular configuration including a pair of edges 55, 56 in generally parallel relationship to each other, two arcuate edges 57, 58, respectively, two shallow U-shaped edges 59, 60 (FIG. 6) and an edge 61 therebetween. The purpose of the slot 54 and particularly the arcuate portions provided by the edges 57, 58 is to allow the wheels 30, 31 to move through the decorator plate 52 between positions of use in contact with the surface S (FIG. 4, in phantom outline and 5) and positions of nonuse (FIGS. 1, 2 and 3).

The base supports 11 and 12 are joined to each other by first pivot means 65 in the form of a relatively long piano hinge welded or otherwise joined to the tubes 16, 46. When the base supports 11, 12 are in the side-by-side coplanar position shown in FIG. 5, luggage can be placed upon both of the supports 11, 12, but upon the base support 12 being pivoted about the pivot means 65 to the position shown in FIG. 6, luggage can simply be placed atop the plate 52 of the base support 12. In this manner, the pivot means 65 permits the luggage trolley 10 to be conveniently converted for use with greater (FIG. 5) or lesser (FIG. 6) pieces of luggage.

Irrespective of the particular in-use position of the luggage trolley 10, be it FIG. 5 or FIG. 6, the same includes handle means generally designated by the reference numeral 70 defined by a first handle member 71, a second handle member 72 and a third handle member 73. The handle member 71 is formed by two generally parallel hollow rods or tubes 74, 75 pivotally connected by pivot means or pins 76, 77 (FIG. 3) to the respective tubes 13, 14 of the base support 11. Likewise, the handle member 72 includes a pair of hollow generally rectangular rods or tubes 78, 80 connected by pivot means in the form of a pivot rod 81 to upper end portions (unnumbered) of the tubes 74, 75.

The handle member 73 is similarly defined by a pair of generally square tubes or rods 81, 82 joined by a bight or hand grip 83 and pivotally connected by a generally square-waved shaped pivot pin or rod 84 which passes through the tubes 81, 82 and is connected to upper end portions (unnumbered) of the tubes 78, 80.

The distance between the outside surfaces of the tubes 81, 82 is generally equal to, though slightly less than, the distances between the inside surfaces of the rods or tubes 78, 80, while the distance between the outside surfaces of the tubes 78, 80 is generally equal to or slightly less than the distance between the inside opposing surfaces of the tubes 74, 75. Due to the latter-noted dimensioning, the handle member 73 can pivot about its pivot pin 84 into nested relationship between the tubes 78, 80 of the handle member 72 while the handle member 72 can likewise be moved within and between the tubes 74, 75 of the handle member 71. The latter can, of course, likewise nest between the tubes 13, 14 of the base support 11, as is best illustrated in FIG. 3 which shows the fully collapsed and stowed position of the handle or handle means 70 upon the base support 11 and within the area defined by the tubes 13 through 16.

Reference is made particularly to FIGS. 7 and 8 of the drawings which illustrate locking means which, since they are identical, are generally designated by the reference numeral 90. The locking means 90 includes housings 91 which are shown welded to the lower end portion (unnumbered) of the tube 80 and to the tube 15, as well as a short tube 19 which underlies and is welded to the edge 18 to either side of the slot 20. Each housing 91 includes a generally circular bore 92 in which is slidably received a locking pin 93 (FIG. 8) having an exteriorly exposed handle 94 and a stem 95. The stem 95 includes a pair of intergral annular shoulders 96, 97 of a diameter matching the diameter of the bore 92 so that the pin 93 can be readily moved between unlocked (solid outline in FIG. 8) and locked (phantom outline in FIG. 8) positions. A central portion of the stem 95 is enlarged as an annular or peripheral tapered shoulder 98, and the shoulder 98 defines with the annular ribs 96, 97 respective detent-receiving annular channels 100, 101 which selectively receive a locking detent 102 biased by a spring 103 radially outwardly from a blind bore 104 toward the axis of the pin 93. When the detent 102 lies in the channel 101, the pin is held in its unlocked position, whereas if the pin is pushed to its phantom outline position, the detent will fall into the channel 100 and hold the locking pin with a locking terminal nose 105 thereof seated in an opening 106 formed in a wall (unnumbered) of the tube 75. Thus, with the locking noses 106 held in their retracted position (solid outline in FIG. 8), the handle members 71, 72, 73 can be readily folded from their nested to their in-use position and vice versa and in the latter, the various tubes can be locked together against pivoting upon the noses 105 being received in the associated openings 106 of the various tubes 74, 75; 78, 80 and 73, 81, as is readily apparent from FIG. 5 which shows all of the locking means 90 positioned with their respective locking pins 93 in the phantom outline position shown in FIG. 8 to maintain the handle means 70 locked in the position shown in FIG. 5. However, upon pulling all of the locking pins 93 outwardly to their solid outline positions (FIG. 8), the handle 70 can be folded to the nested position best shown once again in FIG. 3.

A generally J-shaped hook 110 is connected to the tube 81 and terminates in a curved end 111. This permits items such as tote bags, shoulder bags, camera carrying cases and the like to be hung from the hook 110 to free the hands of the user to grip the tube 83 while pushing the trolley as need be during its operation. The curved end 111 prevents such articles hanging from the J-shaped hook 110 from falling therefrom.

The base support 12 further includes means for restraining luggage upon the base support 12 while also functioning as a carriage for the wheels 30, 31, the latter noted luggage restraining means and/or carriage being generally designated by the reference numeral 115. The carriage or member 115 includes a pair of generally parallel tubular rods 116, 117 which are welded to similar parallel tubes or rods 118, 119, with the distance between the outer surfaces of the latter corresponding generally to the distance between the inner surfaces of the tubes 44, 45 such that the member 115 can be nested within the base support 12, as is best illustrated in FIG. 3 of the drawings. The luggage restraining member or carriage 115 can be pivoted between its nested position and its upright position (FIG. 5) by means of a pivot pin 120 in the form of a rod which passes through the tube 117 and is connected to the tubes 44, 45 (FIGS. 3 and 5).

Locking means 90', 90" (FIGS. 3, 5 and 9) are so identified because they are virtually identical to the locking means 90 heretofore described. However, locking means 90', 90" include respective tubular stems 125 (FIGS. 3 and 9) which are welded to the tube 117 and, therefore, are movable therewith when the luggage restraining member or carriage 115 is moved between the nested position (FIG. 3) and the in-use or upright position (FIG. 5) and vice versa. In the latter position, the locking noses 106 of the locking means 90', 90" are in alignment with and enter into the openings 51 (FIGS. 3 and 9) in the plate 50 thereby locking the luggage restraining member 115 in its upright position. The stems 125 further received the vertical shaft 40 of the wheels 30, 31 and thus upon the pivoting movement of the carriage or luggage restraining member 115 between the positions just defined, the wheels 30, 31 likewise move through the slot 54 (FIG. 3) and particularly the areas defined by the curved or arcuate edges 57, 58 to move the wheels between their ground-contacting position (FIG. 5) and their nonground-contacting position (solid lines in FIG. 4). Obviously, to pivot the carriage 115 from the position shown in FIG. 5 to that shown in FIGS. 3 and 4, the handles 94 need but be pulled outwardly to withdraw the locking noses 105 from the openings 51.

In FIG. 5, luggage may be placed upon both of the base supports 11 and 12 and, of course, the member 115 functions to prevent luggage from falling forwardly and possibly off the base support 12 as could occur in the absence of the luggage restraining member 115 if, for example, forward motion of the luggage trolley 10 were abruptly stopped by the wheels 30, 31 encountering a less than smooth surface. Furthermore, to prevent such inadvertent loss of luggage pieces, straps, bungee cords or like tie-downs can be connected between the luggage restraining member 115 and particularly the tube 116 thereof and the pivot pin or rod 84 which is particularly curved in a sinusoidal or square waved pattern to facilitate the securement of straps, ropes, or the hooks of bungee cords (not shown) particularly to the U-shaped portions (unnumbered) of the rod 84 opening toward the J-shaped hook 110.

While the luggage trolley of FIG. 5 is shown to accommodate maximum luggage, the same is readily convertible to the configuration shown in FIG. 6 simply by releasing the locking means 90', 90'', folding the luggage restraining member 115 into its nested position (FIG. 3) and thereafter pivoting the base support 12 about the pivot means 65 to bring the base support 12 into overlying/nested relationship to the base support 11. During the latter-noted folding, the wheels 30, 31 will pass upwardly through the slot 54, as is most readily visualized from FIG. 4, as the luggage restraining member 115 is pivoted about the pivot pin or rod 120. Furthermore, as the base support 12 is pivoted toward the a base support 11, the wheels 30, 31 will tend to swing under the influence of gravity from their positions partially projecting through the arcuate portions 57, 58 of the slot 54 to a position totally outboard of these same slot portions, as is most evident in the phantom outline position of the base support 12 and the associated wheel 30 shown in FIG. 2. Furthermore, as the base support approaches its fully nested position (solid lines in FIG. 2), the wheels 30, 31 will pass through the slot 20 and particularly the arcuate portions 24, 23, respectively, to a position in which the wheels 30, 31 will not contact the surface S (FIG. 2) nor will they interfere should, for example, luggage be placed atop the plate 52 (FIG. 6). Thus, in the converted position shown in FIG. 6 and the storage position in FIG. 1 (which is also a use position with the handle 70 collapsed and folded), the wheels 30, 31 are in an out-of-the way stored position or condition. When the luggage trolley 10 is in the position shown in FIG. 1, any appropriate means may be utilized to releasably secure the base supports 11, 12 to each other, and it is to be particularly noted that in this position, the decorator plates 17, 52 substantially enclose the various elements sandwiched therebetween, thus lending an attractive and aesthetic appearance to the luggage trolley 10 in its folded or stowed condition (FIG. 1).

Reference is now made to FIGS. 10 and 11 of the drawings which illustrate an embodiment of the invention with respect to handle means 70' and more specifically locking means 140. The handles 70' has been primed to indicate structure corresponding to that of the handle 70, as for example, the corresponding handle members 71', 72', 73' and the various tubes 74', 75', 78', 80', 83', and pivot means or rods 76', 81', and 84'. When the locking means 140 are in the position shown in FIG. 10, the handle 70' cannot fold to its nested condition, but upon movement of the locking means 140 from the phantom outline to the solid outline position shown in FIG. 11, each of the handle members 71', 72' and 73' can be appropriately pivoted to a nested condition (not shown) corresponding to that of the handle 70 best shown in FIG. 3.

Each of the locking means 140 is identical and includes a generally U-shaped locking member defined by two side plates 141, 142 joined by a bight portion 143 with a pin 144 passing through the side plates 141, 142 and connecting the locking means 140 to the various tubes 74', 75', 78' and 80'. Hence, in the solid line position in FIG. 11, the tubes 74', 78' can freely pivot relative to each other by virtue of the pivot pin 81'. However, upon movement of the locking means 140 to the phantom outline position shown in FIG. 11, the side plates 141, 142 thereof embrace the tubular rod or tube 78' and prevent relative pivoting movement between the tubes 74', 78'.

Hence, in lieu of the locking means 90 associated with the handle 70, the handle 70 may instead be provided with the locking means 140.

Reference is made to FIGS. 12 through 14 of the drawings wherein another handle has been double primed numerically for ease of identification relative to parts similar or identical to those of the handle 70. In this case, a handle or handle means 70'' includes handle member 71'', 72'' and 73''. The handle member 71'' includes tubes 74'' and 75'' joined by a pivot pin or rod 76'' to tubes 13'' and 14''. The latter permits the handle member 71'' to be pivoted from its upright position to a position nested between the tubes 13'', 14''. A tube 150 spans and is welded to upper portions of the tubes 74'' and 75''.

The handle member 72' includes tubular rods 78'' and 80'', but in lieu of connecting these by a pivot to the respective tubes 74'' and 75'', the rods 78'', 80'' are telescopically received within the rod 74'' and 75''. Appropriate conventional locking means 151 associated with the tubes 74'' (not shown) and 75'' hold the handle members 71'', 72'' in their extended position (shown). However, upon operating the conventional spring locking means 151, the rods or tubes 78'', 80'' can be telescoped virtually entirely within the rod 74'' and 75'', respectively, incident to nesting the latter within and between the tubes 13'', 14''. The rods 78'' and 80'' are preferably bridged for reinforcement purposes by a hollow rectangular tube 152 welded therebetween.

The handle member 73'' includes a hand grip portion 155 welded to a pair of legs 156, 157, and each of the latter are connected by a pivot pin 158 to a further leg 160 (FIGS. 13 and 14) which passes through a slot 161 in the tube 152 and has a flange 164 which confines a spring 165 between the flange 164 and an upper wall portion 166 of the tube 152 adjacent the slot 161. The spring 165 and a like spring (not shown) associated with the tube 78'' normally urges the legs 160 downwardly within the tubes 78'' and 80''.

Hence, when the handle member 73'' is in its use position (solid lines in FIGS. 12 and 14), an end face 167 of each of the legs 156, 157 will seat upon the end wall 166 of the tube 152 in spanning relationship to the slot 167. The handle member 73'' will be held in this position under the influence of the spring 165 forcefully pulling the leg 160 downwardly within each of the tubes 78'', 80'', thus holding the handle 73'' biasingly, yet firmly, in its use (solid outline) position. However, should it be desired to fold the handle to its nonuse position, the handle is merely pivoted in a clockwise direction, as viewed in FIG. 14, against the force of the springs 165, drawn slightly upwardly, and thereafter the handle can be positioned with its legs 156, 157 aligned with its legs 160, 160 and with the latter being aligned with respective tubes 78'', 80'' after which a downward force will progressively introduce the legs 156, 157 entirely into the upper end portions of the tubes 78'' and 80'', respectively, until the hand grip 155 is essentially adjacent the tube 152. During this movement, the spring 165 is, of course, carried by the leg 160 in each of the tubes 78'', 80'' while a retracting operation reversing that just described will bring the spring 165 in each tube 78'', 80'' to its position bearing against the overlying wall 166. Hence, the handle 70'' is moved to its nesting position by a telescopic action in lieu of the pivoting action heretofore described relative to the handles 70, 70'.

Reference is made to FIGS. 5 and 6 which depict in phantom outline the manner in which bungee cords or straps B having hooks H are utilized in connection with the luggage trolley in the two operative positions thereof (FIGS. 5 and 6). In FIG. 5 the hooks H of the bungee cords B are connected to the U-shaped portions (unnumbered) of the rod 84, as was heretofore described. These bungee cords B are crossed or centrally joined (not shown) and opposite hooks H can be received in openings (unnumbered) of brackets (also unnumbered) between the tubes 116, 118 instead of merely being wrapped around the tube 116. In FIG. 6 the hooks H are preferably connected by inserting ends (unnumbered) thereof into the open ends of the tubes 44, 45.

Another portable, foldable and convertible luggage trolley constructed in accordance with this invention is generally designated by the reference numeral 210 (FIGS. 15-18), and includes a pair of base supports 211, 212, (FIGS. 15-18) adapted to be positioned in a generally common horizontal plane in side-by-side coplanar relationship in a first position (FIGS. 17-18) and being movable to a second position at which the pair of base supports 211, 212 are generally stacked or nested relative to each other (FIGS. 15 and 16).

The base support 211 is formed of a pair of hollow square rods or tubes 213, 214 disposed in generally parallel relationship to each other, a similar hollow square rod or tube 215 spanning and welded to upper surfaces of the tubes 213, 214, and another hollow rod or tube 216 parallel to the tube 215 and welded to the tubes 213, 214, (FIGS. 17 and 18).

The base support 211 is supported by four wheels or wheel means 232-235 (FIG. 18) which are mounted for rotation on identical horizontal shafts 237 of identical brackets or casters 238 mounted in a conventional manner by shafts 239 for pivoting through 360° about a vertical axis through the use of gyro action swivel bearings where generally one row of ball bearings contained in a swivel raceway is used for both load and thrust associated with each of the wheel means or wheels 232-235. A shaft 240 shown in FIG. 19 is associated with wheels 230, 231 of the base support 212. The wheels 230-235 the brackets or casters 238, etc. are conventional hardware and the specific details thereof form no part of the present invention, however, reference is made to FIGS. 16 and 28 which illustrate the offset relationship between planes P1, P2 taken through the axes of the shafts 237 of the wheels 232, 234 and each shaft 239 thereof, respectively. The offset relationship between the planes P1, P2 allows the wheels 232, 234 to rotate under the influence of gravity to the position thereof shown in FIG. 28 when the luggage trolley 210 is moved to a generally vertical position (FIG. 28). In other words, the mass or weight of the wheels 232, 234 causes the same to rotate about the axis of their respective shafts 239 and thus move to the position shown in FIG. 28 when the luggage trolley 210 is positioned generally upright. In the latter position the wheels 232, 234 will contact a supporting surface Ss and function as stabilizers to permit the luggage trolley 210 to be self-supporting in the vertical position shown in FIG. 28.

The second base support 212 is formed by a pair of hollow generally square tubes or rods 244, 245 disposed and in parallel relationship to each other and being welded at one end to a transverse rod 246. Remote from and generally parallel to the hollow tube or rod 246 is a hollow tube 247 welded to the tubes 244, 245. Two short rods 250, 251 are welded to the respective rods 244, 245 and are in alignment with each other and are parallel to the rod 247. The distance between the ends (unnumbered) of the short rods 250, 251 is adequate to permit free pivotal movement therebetween of the wheels 230, 231 during the pivotal movement of a luggage restraining means or carriage 315 (FIG. 18) between the position shown in FIGS. 16, 17 and 18, as will be described more fully hereinafter.

The base supports 211 and 212 are joined to each other by first pivot means 265 in the form of a relatively long piano hinge welded or otherwise joined to the tubes 216, 246. When the base supports 211, 212 are in side-by-side coplanar position shown in FIG. 18, luggage can be placed upon both of the supports 211, 212, but upon the base support 212 being pivoted about the pivot means 265 to the position equivalent to that shown in FIG. 6 relative to the luggage trolley 210, luggage can simply be placed in spanning relationship atop the rods 244, 245, 250 and 251 of the base support 212. In this manner the pivot means 265 permits the luggage trolley 210 to be conveniently converted to use with greater (FIG. 18) or lesser (as in FIGS. 1, 6, and 16) pieces of luggage.

Another purpose of the pivot means 265 is to permit flexing of the baggage loading plane when the luggage trolley 210 is in use fully extended with base supports 211, 212 in their side-by-side coplanar position, as shown in FIG. 18. The base support 212 usually pivots about 180° onto a flat supporting surface S when pivoted about the pivot means 265 and in the use position best shown in FIG. 18 will remain in or about that position when moving on even surfaces. Uneven surfaces or a change in surface plane or grade are more readily adjusted to by altering base support 212 to flex about pivot means 265 upwards or downward up to some 20° or thereabouts, as required by ground contours. The baggage load is allowed to bear some compression or expansion within the loading plane.

Irrespective of the particular in-use position of the luggage trolley 210, be it in FIG. 18 or as in FIG. 6, the same includes handle means or a handle generally designated by the reference numeral 270 defined by a first handle member 271 and a second handle member 272. The handle member 271 is formed by two generally parallel hollow rods or tubes 274, 275 each pivotally connected by pivot means or pivot pins 276 (FIGS. 23 and 26) to a short tube 273 welded to the underside of each of the respective tubes 213, 214 of the base support 211. A transverse short hollow rod or tube 277 is welded to the underside of each short tube 273 (FIGS. 23 and 27) and functions as an abutment or stop by contracting a lower terminal end portion (unnumbered of each tube 274, 275 to prevent clockwise (as viewed in FIGS. 23 and 26) pivotal movement of the first handle member 271 beyond the vertical position shown in FIGS. 23 and 26.

The handle member 272 also includes a pair of hollow generally rectangular rods or tubes 278, 280 connected by pivot means in the form of a pivot rod 279 to upper end portions (unnumbered) of the tubes 274, 275. The handle member 272 has a pair of offset tubes or rod portions 281, 282 joined by a bight or handle grip 283 and spanned by a generally square-waved shaped fixed pin or rod 284 which passes through or near the bent portions, 269, 289 between the respective tubes 278, 281 and 280, 282.

The distance between the outside surfaces of the tubes 278, 280 is generally equal to, though slightly less than, the distances between the inside surfaces of the rods or tubes 274, 275 while the distance between the outside surfaces of the tubes 274, 275 is generally equal to or slightly less than the distance between the inside opposing surfaces of the tubes 213, 214 of the base support 211. Due to the latter noted dimensioning the handle member 272 can pivot about the pivot pin 281 into nested relationship between the tubes 274, 275 of the handle member 271 while the handle member 271 can likewise be moved within and between the tubes 213, 214 of the base support 211 and nest therein, as is best illustrated in FIGS. 15 and 17, which shows the fully collapsed and stowed position of the handle or handle means 270 upon the base support 211 and within the area defined by the tubes 213, through 216.

The mounting plates of casters 238 on wheel means 232, 234 of the base support 211 are additionally used to support and contain the ends of a tube 332 of a baggage restraining member 315 within the base support 211 when the trolley 210 is being used in the reduced carrying capacity position, as is most apparent from FIG. 15. In this reduced carrying capacity position or use mode the baggage restraining member 315 forms part of the load bearing platform and in particular tubes 330, 331 act as a grid permitting baggage or loads of small size to be carried within tubes 244, 245.

The mounting plates of casters 238 on wheel means 232-235 also support and contain within the base support 211 the fully collapsed and stowed handle 270, as is best shown in FIG. 17. Further, when handle member 272 is in nested relationship between the tubes 274, 275 of the handle member 271 and the handle member 271 is then nested between the tubes 213, 214 of the base support 211 the inner rims of caster mounting plates 238 of wheel means 233, 235 cam on the outsides of the tubes 281, 282 of handle member 272 to guide it into nested position retaining handle grip 283 clear of ground contact, as is best shown in FIG. 16.

Reference is made particularly to FIGS. 23-25 of the drawings which illustrate handle locking or latching means which, since they are identical, are generally each designated by the reference numeral 290. The handle locking means or locks 290 each include a sheet material body 291 of a generally U-shaped configuration defined by a bight 292 and a pair of legs 293, 294, the latter of which is at the rear side of the luggage trolley 210 or to the right of the tubes 278, 280, 274 and 275, as viewed in FIGS. 18, 23 and 24. A pivot pin 295 pivotally attaches each locking means 290 to its associated tube 274, 275 for movement between the latched position (solid lines in FIGS. 18 and 23-25) and the unlatched position (phantom outline in FIG. 24). In the latched position the tubes 278, 280 are embraced between the legs 293, 294 thus maintaining the tubes 274, 278 and 275, 280 in a generally common vertical plane, as is illustrated in FIG. 18. A transversely extending finger gripping tab 375 of each leg 294 can be manually grasped to pivot each latch 291 from the solid to the phantom outline position, as is readily apparent from FIG. 24. When each latch 290 is in the phantom outline position shown in FIG. 24 the tubes 278, 280 can be readily pivoted backwards or forwards into nested relationship between the tubes 274, 275.

It is to be particularly noted that the latching members 290 cannot be moved beyond the phantom outline position shown in FIG. 24 because an edge 296 of the bight 292 contacts an upper outer edge 297 of each of the rods 275 (shown in FIG. 23) and 274 (not shown). Furthermore, the limit so set by contact between the edges 296, 297 maintains the latches 291 in a position at which gravity would cause the same to fall from the vertical phantom outline position shown in FIG. 24 to the solid outline position shown in the same Figure. In other words, the majority of the weight of the latching means 291 is to the inside of a plane through the pivots 295, as shown in FIG. 24, and since the latching members 291 each are angled to the inside away from the vertical, they will automatically drop from the phantom outline to the solid outline position. Therefore, in order to fold the handle portion 272 downwardly from the position shown in FIG. 15 one must grasp the tabs 375 (FIGS. 23 and 24), therethrough pivot each latching member 291 from the solid to the phantom outline position (FIG. 24), and then merely slightly bump or shake the handle or move the same by thumb pressure slightly to cause the handle member 272 to begin its downward pivotal movement backwards or forwards into nested position between the tubes 274, 275. Once the latching members 290 are released they will again automatically under the influence of gravity occupy the solid outline position of FIGS. 23 and 24. When the handle member 270 is unfolded by pivoting from its nested position between the tubes 274, 275, the tubes 278, 280 eventually contact lower edges 298, or 299 of the respective legs 293, 294 which automatically causes these legs to be moved by the tubes 278, 280 from the solid to the phantom outline position shown in FIG. 24. Once this position is received and the rods 275, 280 and 274, 278 are in a vertical plane, the latching members 290 gravity descend from the phantom outline to the solid outline position once again embracing the tubes 278, 280 in the latched position thereof. The tubes 278, 280 during the latter-described pivoting movement will contact either of the edges 298, 299 depending upon whether the handle member 270 is pivoted forwardly and upwardly, as viewed in FIG. 18, or rearwardly and upwardly as viewed in this same figure. If the handle member 272 is pivoted forwardly and upwardly, the edges 298 will be contacted whereas if the handle member 272 is pivoted rearwardly and upwardly, the edges 299 will be contacted, but in either case the latching members 290 will be automatically moved from solid-to-phantom-solid and thus latched.

Means generally designated by the reference numeral 300 is provided adjacent each of the tubes 274, 275 (FIGS. 18 and 23-27) for releasably latching the handle 270 relative to the base support 211 in the in-use, upright or first position of the handle 271 (FIG. 18). A pivot pin 301 pivotally connects each of the latching means or latch 300 to the transverse tube 215 and thus permits pivoting movement of each latch 300 between the solid and phantom outline position shown in FIG. 24.

Each latching member 300 includes a body of a generally U-shaped configuration defined by a pair of legs 302, 303 and a bight 304 therebetween with the leg 302 being offset generally immediately between its ends by a wall 305 (FIG. 27). The narrower portion of the legs 302, 303 closely spans or bridges the tube 215 and is pivotally connected thereto by the pivot pin 301 while the wider portions of the legs 302, 303 spans or bridges the combined thickness of the tubes 215, 275 (FIG. 27). The bight 304 has a slot 306 which is contoured to embracingly engage the respective or associated tubes 274, 275 as is best illustrated relative to the tube 275 in FIGS. 23 and 27. Another portion or wall 308 of the bight 304 is offset vertically upwardly and merges with a generally horizontally disposed finger tab 310 which is designed to be grasped by a finger of a user to move the latch from the solid outline latch position (FIG. 24) to the unlatched (phantom outline position) thereof. The inward edge 360 (FIGS. 23 and 27) of bight 304 on top of tube 215 and between legs 302, 303 contacts the upper surface of tube 215 to prevent each latching member 300 from opening beyond the requisite minimum.

A resilient latching member 311 is welded to the bight 304 and resiliently bears against the inboardmost surface (unnumbered) of the associated tube 274, 275 when the latter is positioned within the associated slot 306, as is best illustrated in FIG. 27. In the latter position, and that is shown in FIG. 23, the resilient member or tab 311 frictionally grips the associated tube 274, 275 and during movement of the trolley 210 over uneven or rough terrain prevents the latches 300 from bouncing upwardly out of the latched position (FIGS. 23, and 27) because forward pressure of 274, 275 is pivotal and therefore downwards into tab 311. Tabs 311 where they unify the top bight 304 can also act as a cam on the outer edges of tubes 281, 282 of handle member 272 when handle member 272 is moved forwards pivotally into nested position between tubes 274, 275 of handle member 271 thus insuring that each latching member 300 can, if needed, move handle member 272 forwards sufficiently to allow clearance for each latching member 300 to be opened from the solid outline latch position to the unlatched position (phantom outline).

The leg 302 carries cam means 312 in the form of a bent portion of the leg 302 disposed in a generally horizontal plane which has a camming edge 313 of a gradually curved configuration. The cam 312 is responsive to the movement of the handle 270 from its collapsed nested position between the tubes 213, 214 to its upright in-use position (FIG. 18) to automatically move each latch 300 from the position shown in FIGS. 23 and 27 (keeping in mind that the tubes 274, 275 are not within the associated slots 306 but are in their nested position in a horizontal plane) to the phantom outline position generally shown in FIG. 24 and then back to the solid outline position of FIGS. 23 and 27 with the slots 306 embracing the tubes 274, 275. This operation takes place progressively as the tubes 274, 275 progressively are pivoted about their pivots 276 from the nested horizontal plane toward their vertical upright positions. Initially the rear surfaces (unnumbered) of the tubes 274, 275 contact the camming or cam edge 313 of the respective cams 312 which, of course, lie in the plane of pivoting movement of the tubes 274, 275. As the rear surfaces (unnumbered) of the tubes 274, 275 bear against the cam edge 313 of the respective cams 312 the latter progressively pivot the latching members 300 about the associated pivot pins 301 in an upward and inward direction until the phantom outline position of the latching member 300 is reached in FIG. 24. During the continued rearward movement of the tubes 274, 275 the forward surfaces thereof eventually pass the widest portion of the leg 302 and the resilient element 311 into generally a vertical plane (FIG. 26) at which time the lower end portion of the tubes 274, 275 contact the associated transverse bars 277. At this position the slot 306 is in alignment with the associated tube 274, 275 and downward gravity on each latching member 300 will bring the same to the latched position shown in FIG. 23 by movement opposite to that shown in FIG. 24, namely, from the phantom outline to the solid outline position thereof. In other words, the majority of the weight of the latching means 300 is to the outside of a plane through the pivots 301, as shown in FIG. 23, and since the latching members 300 each are angled to the outside away from the vertical they will automatically drop from the phantom outline to the solid outline position. Thus, by merely moving the handle 271 from its nested position the tubes 274, 275 thereof automatically move the latches 300 to a latching condition.

In order to fold a handle portion 271 downwardly, one must grasp the finger tabs 310 of each latching member 300, therethrough pivot each latching member 300 from the solid to the phantom outline position, and then merely slightly bump or shake the handle or move the same by thumb pressure slightly to cause the handle member 271 to begin its downward forward pivotal movement into nested position between the tubes 213, 214. Once the latching members 300 are released they will again automatically under the influence of gravity occupy the solid outline position.

Each of the legs 302 also carries a ledge 320 which project in a direction toward the tube 216 (FIG. 18). When the luggage restraining member 315 is nested within the base support 212 and the latter has been pivoted about the hinge 265 to the position shown in FIG. 15 the ends 250, 251 of the tubes 244, 245, respectively, rest upon the latches 320 (FIGS. 15 and 16) and thus prevent latching means 300 from moving from the solid outline position when the luggage trolley 210 is being carried by hand or is stored in a vertical position, or more particularly, being used in the reduced size mode best seen in FIG. 6.

Reference is made to FIG. 17 of the drawings which illustrates a dimension D1 between the axis of the pivot pin 265 and the outer surfaces (unnumbered) of the tubes 250, 251. The distance D1 is greater than another distance D2 as measured from the axis of the pivot pin 265 and the resilient latching members 325 fixed to the upper surfaces of tubes 213, 214. Since the distance D1 is greater than the distance D2, upon the pivoting of the base support 212 from the position shown in FIGS. 17 and 18 to the position shown in FIG. 16, the outer surfaces (unnumbered) of the tubes 250, 251 will bear against the resilient latching elements 325 deflecting them slightly to the right, as viewed in FIGS. 16 and 17, and creating a resilient gripping action between the elements 325 and the engaged surfaces of the tubes 250, 251. This automatically locks the base support 212 to the base support 211 and permits the luggage trolley 210 to be carried in a vertical plane by grasping the tube 215 (FIG. 15), and when being so carried there is no fear of the base support 212 inadvertently unfolding. The base support 212 may be automatically unlocked from the base support 211 by manually grasping the end of either tube 250, 251 and pulling open.

The latching members 325 additionally perform another function in conjunction with the legs 302 (FIG. 23) when the handle 270 is in its operative latched position latched by each of the latching members 300. As was noted earlier in connection with FIG. 23, the tubes 274, 275 of the handle 270 are held captive in the notches 306 which are in part defined by each of the legs 302 (FIG. 23). Forces applied against the handle 270 in FIG. 23 from right-to-left to push the luggage trolley 210 forward cause the tubes 274, 275 to forcefully bear against the legs 302 which could cause the legs 302 to bend, twist or distort. However, the legs 302 are each positioned rearwardly of and against an associated latching member 325 in the latched position of the latching members 300, as is best illustrated in FIGS. 23 and 26, and any force applied to the handle 270 tending to move the tubes 274, 275 counterclockwise, as viewed in FIG. 26, would be resisted by the respective latching members 325. Thus the latching members 325 prevent torquing, twisting or bending of the legs 302 and assure that the cam latching herefore described effected by the latching member 312 is maintained even though the associated mechanisms might be abused in use.

The luggage restraining member 315 (FIGS. 17 and 18) is formed by a pair of hollow rectangular tubes 330, 331 bridged by and welded to another hollow tube 332. Turning specifically to FIGS. 19-22 of the drawings, the tubes 330, 331 are pivoted to the tube 247 by an associated pivot pin 333 passing through the tubes and through legs 334, 335 of an identical generally U-shaped bracket 336 welded to the tube 247. The legs 334, 335 are bridged by a bight or wall 337.

A pair of latching members, each generally designated by the reference numeral 340 is shown in FIG. 20 in its latched position maintaining the tubes 330, 331, confined within the associated U-shaped bracket 336 in the operative upright position of the luggage restraining member 315. Each of the latching means 340 includes a generally downwardly opening U-shaped body formed by a pair of opposite parallel legs 339, 341 and a bight 342 therebetween which includes a finger engaging tab 343. Each leg 341 has an extension 344 which are collectively pivotally connected by a sheet metal screw 345 to the tube 247 to permit the pivoting of the latching means or members 340 from the solid position shown in FIGS. 19 and 20 to the right-handmost solid position shown in FIG. 19. An integral vertical wall 346 of each bight 342 carries at its upper end a generally horizontally disposed cam 347 having a curved cam surface 348. The function of the cam 347 and cam surface 348 of each latch 340 is identical to that of the cam 312 of latches 300, namely, to effect the automatic latching of the tubes 331, 332 in their upright position during movement thereof from a horizontal plane (FIG. 17) to the vertical positions shown in FIGS. 18 through 22. Assuming, for example, that the luggage restraining member 315 is in the horizontal position shown in FIG. 17, the upward pivoting movement thereof progressively brings the tubes 330, 331 into contact with the cam surfaces 348 of the respective cams 347 causing the same to swing from the position thereof with the causing the same to swing from the position thereof with the bights 342 resting atop the upper surface of the tube 247 to the inclined unlatched position shown by the right-handmost latched 340 of FIG. 19. Once the tubes 330, 331 have passed fully into the brackets 336, the weight of the latches 340 simply cause the same to drop downwardly from the position of the latch 340 shown in the right to FIG. 19 to the latched positions of FIGS. 20-22 and the left-handmost latch 340 of FIG. 19. In the latched position a downward abutment or ledge 350 bears against each tube 330, 331 to hold it confined intimately within its associated housing 336 and also moves into an upwardly opening notch 351 (FIGS. 20 and 21) of each leg 335 to maintain the latched condition of each of the latches 340 as shown in FIGS. 20-22. Pivotal hinging of tubes 331, 332 cause any closing pressure on baggage restraining member 315 to force the ledge 350 down into the upwardly opening notch 351.

Abutments or stops 355, 356 (FIG. 19) are welded to the forward side of the tube 247 at equal distances from the sheet metal screw 345. The tabs or abutments 355, 356 are engaged by the legs 339 of the latches 340 to prevent the same from opening more than the required minimum, as is best illustrated by the right-hand most latch 340 of FIG. 19. Both latch members or latches 340 can be opened or moved from the latch to the unlatched position, as best shown in FIG. 19, by placing the fingers of one hand underneath each finger-engaging tab 343 and raising the latching simultaneously to the fully opened position determined by each abutment 355, 356, again as is best shown in FIG. 19. When base support 212 is pivoted about the pivot means 265 to the position equivalent to that shown in FIG. 6 relative to the baggage trolley 210, latch members 340 will drop downwards into the equivalent inverted position of the fully opened position. The abutments 355, 356 hold the latch members 340 a sufficient distance above the supporting surface S to allow adequate ground clearance when the luggage trolley 210 is in use in the reduced size mode, as shown in FIG. 6.

Although only a preferred embodiment of the invention has been specifically illustrated and described herein, it is to be understood that minor variations may be made in the apparatus without departing from the spirit and scope of the invention, as defined in the appended claims.

What is claimed is:

1. A portable and foldable luggage trolley comprising a base support adapted to be disposed in a generally horizontal plane for supporting luggage thereupon, a handle, first means for pivoting said handle to said base support for pivoting movement between a first position in generally upright relationship to said base support and a second position in generally adjacent relationship to said base support, means for releasably latching said handle relative to said base support in said first position, second means for pivoting said latching means to said base support for pivoting movement between a first latched position latching said handle relative to said base support in said first handle position and a second unlatched position permitting relative pivoting movement of said handle between the first and second positions thereof, means responsive to pivotal movement of said handle from said second to said first handle position for pivoting said latching means to said first latched position, said releasable latching means being disposed adjacent said first pivoting means, and said second pivoting means being disposed in a generally horizontal plane.

2. The portable and foldable luggage trolley as defined in claim 1 wherein said first latched position and second unlatched position are one and the same.

3. The portable and foldable luggage trolley as defined in claim 1 wherein said responsive means is effective for pivoting said latching means from said second unlatched position to said first latched position during movement of said handle from said second handle position to said first handle position.

4. The portable and foldable luggage trolley as defined in claim 1 wherein said first latched position and second unlatched position are one and the same, and said responsive means is effective for pivoting said latching means from said second unlatched position to said first latched position during movement of said handle from said second handle position to said first handle position.

5. The portable and foldable luggage trolley as defined in claim 1 wherein said responsive means is a cam surface of said latching means.

6. The portable and foldable luggage trolley as defined in claim 1 wherein said first pivot means establishes a path of travel of said handle which lies in a plane generally normal to a horizontal plane of said base support, and said responsive means is at least partially within said plane in said unlatched position of said latching means.

7. The portable and foldable luggage trolley as defined in claim 1 including means for releasably holding said latching means in said first latched position.

8. The portable and foldable luggage trolley as defined in claim 1 including means for biasingly clamping said latching means in said first latched position.

9. The portable and foldable luggage trolley as defined in claim 1 wherein said latching means includes a slot contoured to embracingly engage said handle in said first latched position.

10. The portable and foldable luggage trolley as defined in claim 1 wherein said first and second pivoting means have axes disposed generally normal to each other and in parallel planes.

11. The portable and foldable luggage trolley as defined in claim 1 wherein said base support includes a generally horizontally disposed bar, said first pivoting means is carried by said bar, said latching means is defined by a pair of legs and a bight therebetween, and a slot in said bight being contoured to embracingly engage said handle in said first latched position.

12. A portable and foldable luggage trolley comprising a base support adapted to be disposed in a generally horizontal plane for supporting luggage thereupon, a handle, first means for pivoting said handle to said base support for pivoting movement between a first position in generally upright relationship fo said base support and a second position in generally adjacent relationship to said base support, means for releasably latching said handle relative to said base support in said first position, second means for pivoting said latching means to said base support for pivoting movement between a first latched position latching said handle relative to said base support in said first handle position and a second unlatched position permitting relative pivoting movement of said handle between the first and second positions thereof, means responsive to pivotal movement of said handle from said second to said first handle position for pivoting said latching means to said first latched position, said base support includes a generally horizontally disposed bar, said first pivoting means is carried by said bar, said latching means is defined by a pair of legs and a bight therebetween, a slot in said bight being contoured to embracingly engage said handle in said first latched position, and said pair of legs being in embracing relationship to said bar and handle in said first latched postition.

13. The portable and foldable luggage trolley as defined in claim 1 wherein said responsive means is a cam surface of said latching means, said first pivot means establishes a path of travel of said handle which lies in a plane generally normal to a horizontal plane of said base suppport, and said cam surface is within said plane in said unlatched position of said latching means.

14. The portable and foldable luggage trolley as defined in claim 13 wherein said first latched position and second unlatched position are one and the same, and said responsive means is effective for pivoting said latching means from said second unlatched position to said first latched position during movement of said handle from said second handle position to said first handle position.

15. The portable and foldable luggage trolley as defined in claim 13 including means for biasingly clamping said latching means in said first latched position.

16. The portable and foldable luggage trolley as defined in claim 13 wherein said latching means includes a slot contoured to embracingly engage said handle in said first latched position.

17. The portable and foldable luggage trolley as defined in claim 14 including means for biasingly clamping said latching means in said first latched position.

18. The portable and foldable luggage trolley as defined in claim 14 wherein said latching means includes a slot contoured to embracingly engage said handle in said first latched position.

19. The portable and foldable luggage trolley as defined in claim 18 including means for biasingly clamping said latching means in said first latched position.

20. The portable and foldable luggage trolley as defined in claim 1 including a handle, first means for pivoting said handle to said base support for pivoting movement between a first position in generally upright relationship to said base support and a second position in generally adjacent relationship to said base support, means for releasably latching said handle relative to said base supporting said first handle position, second means for pivoting said latching means to said base support for pivoting movement between a first latch position, latching said handle relative to said base support in said first handle position and a second unlatched position permitting relative pivoting movement of said handle between the first and second positions thereof, means responsive to pivotal movement of said handle from said second handle position to said first handle position for pivoting said handle latching means to said first handle latched postition, said releasable handle latching means being disposed adjacent said first pivoting means, said second pivoting means being disposed in a generally horizontal plane, means for restraining the movement of luggage along said base support in at least one direction, said luggage movement restraining means being defined by at least one luggage restraining member adapted in a first luggage restraining position to project generally upright above said horizontal plane, first pivot means for pivoting said luggage restraining member for pivoting movement between said first luggage restraining position and a second position in generally adjacent relationship to said base support, means for releasably latching said luggage restraining member relative to said base support in said first luggage restraining position, second means for pivoting said last-mentioned latching means to said base support for pivoting movement between a first latched postition latching said luggage restraining member relative to said base support in said first luggage restraining position and a second luggage nonrestraining position, and means responsive to pivotal movement of said luggage restraining member from said second luggage nonrestraining position to said first luggage restraining position for pivoting said last-mentioned latching means to said first latched position.

21. The portable and foldable luggage trolley as defined in claim 20 wherein said last mentioned first latched and second unlatched positions are one and the same.

22. The portable and foldable luggage trolley as defined in claim 20 wherein said last-mentioned responsive means is effective for pivoting said last-mentioned latching means from said second unlatched position to said first latched position during movement of said luggage restraining member from said luggage nonrestraining position to said luggage restraining position.

23. The portable and foldable luggage trolley, as defined in claim 20 wherein said last-mentioned first latched and second unlatched positions are one and the same, and said last-mentioned responsive means is effective for pivoting said latching means from said second unlatched position to said first latched position during movement of said luggage restraining member from said luggage nonrestraining position to said luggage restraining position.

24. The portable and foldable luggage trolley as defined in claim 20 wherein said last-mentioned responsive means is a cam surface of said latching means.

25. The portable and foldable luggage trolley as defined in claim 20 wherein said last-mentioned first pivot means establishes a path of travel of said luggage restraining member which lies in a plane generally normal to a horizontal plane of said base support, and said last-mentioned responsive means is at least partially within said plane in said unlatched position of said latching means.

26. The portable and foldable luggage trolley as defined in claim 20 including means for releasably holding said last-mentioned latching means in said first latched position.

27. The portable and foldable luggage trolley as defined in claim 20 wherein said last-mentioned first pivot means establishes a path of travel of said luggage restraining member which lies in a plane generally normal to a horizontal plane of said base support, said last-mentioned responsive means is at least partially within said plane in said unlatched position of said latching means, means for abutting said luggage restraining member to establish the end of its travel along said path of travel at said first luggage restraining position, and said luggage restraining member being sandwiched between said abutting means and said latching means in said first latched position.

28. The portable and foldable luggage trolley as defined in claim 20 wherein said last-mentioned first and second pivoting means have axes disposed generally normal to each other.

29. The portable and foldable luggage trolley as defined in claim 27 wherein said last-mentioned responsive means is a cam surface of said latching means.

30. The portable and foldable luggage trolley as defined in claim 27 including means for releasably receiving said latching means in said first latched position.

31. The portable and foldable luggage trolley comprising a base support adapted to be disposed in a generally horizontal plane for supporting luggage thereupon, means for restraining the movement of luggage along said base support in at least one direction, said luggage movement restraining means being defined by at least one luggage restraining member adapted in a first luggage restraining position to project generally upright above said horizontal plane, first pivot means for pivoting said luggage restraining member for pivoting movement between said first luggage restraining position and a second position in generally adjacent relationship to said base support, means for releasably latching said luggage restraining member relative to said base support in said first luggage restraining position, second means for pivoting said latching means to said base support for pivoting movement between a first latched position latching said luggage restraining member relative to said base support in said first luggage restraining position and a second luggage nonrestraining position, means responsive to pivotal movement of said luggage restraining member from said second luggage nonrestraining position to said first luggage restraining position for pivoting said latching means to said first latched position, said first pivot means establishes a path of travel of said luggage restraining member which lies in a plane generally normal to a horizontal plane of said base support, said responsive means being at least partially within said plane in said unlatched position of said latching means, means for abutting said luggage restraining member to establish the end of its travel along said path of travel at said first luggage restraining position, said luggage restraining member being sandwiched between said abutting means and said latching means in said first latched position, means for releasably receiving said latching means in said first latched position, said releasably receiving means includes an upwardingly opening slot in said abutting means, and said latching means includes a portion seated in said slot when said latching means is in said first latched position.

* * * * *